United States Patent [19]
Nudelmont

[11] 3,778,801
[45] Dec. 11, 1973

[54] APPARATUS FOR INDICATING VOLTAGE PRESENCE, PHASE SEQUENCE, VOLTAGE MAGNITUDE, GROUND FAULTS, ETC. IN AN ELECTRICAL POWER DISTRIBUTION SYSTEM

[76] Inventor: Jean-Claude Nudelmont, 130 rue J. P. Timbaud, Courbevoie, Hauts-de-Seine, France

[22] Filed: Apr. 12, 1971

[21] Appl. No.: 133,049

[30] Foreign Application Priority Data
Apr. 10, 1970 France .............................. 7013010
Mar. 24, 1971 France .............................. 7110378

[52] U.S. Cl............. 340/253 R, 324/73 R, 340/255
[51] Int. Cl. ......................................... G08b 19/00
[58] Field of Search................... 340/255, 252, 253; 324/51, 266, 73 R; 317/18, 18 A

[56] References Cited
UNITED STATES PATENTS

| | | |
|---|---|---|
| 2,660,717 | 11/1953 | Hood ................................. 340/255 |
| 851,149 | 4/1907 | Woodbridge et al. ............... 340/255 |
| 396,582 | 1/1889 | Loomis ............................... 340/255 |
| 383,666 | 5/1888 | Shallenberger ..................... 340/255 |
| 2,428,563 | 10/1947 | Fountain............................. 340/255 |
| 3,611,036 | 10/1971 | Edson ............................ 340/255 X |

OTHER PUBLICATIONS
Check that Ground by R. Loewe; Allis Chalmers Electrical Review, Second Quarter, 1948; 5 pages Primary Examiner—John W. Caldwell
Assistant Examiner—Daniel Myer
Attorney—Sughrue, Rothwell, Mion, Zinn & MacPeak

[57] ABSTRACT

An apparatus for monitoring circuit continuity, phase sequence, voltage magnitude, ground connection, etc. in a multi-phase electrical distribution network. A first series of indicator lamps monitor circuit continuity from phase to phase and from phase to ground. A second series of selectively thresholded lamps indicate voltage magnitude and additional indicator lamps are provided to indicate phase sequence and the presence of alternating current.

12 Claims, 11 Drawing Figures

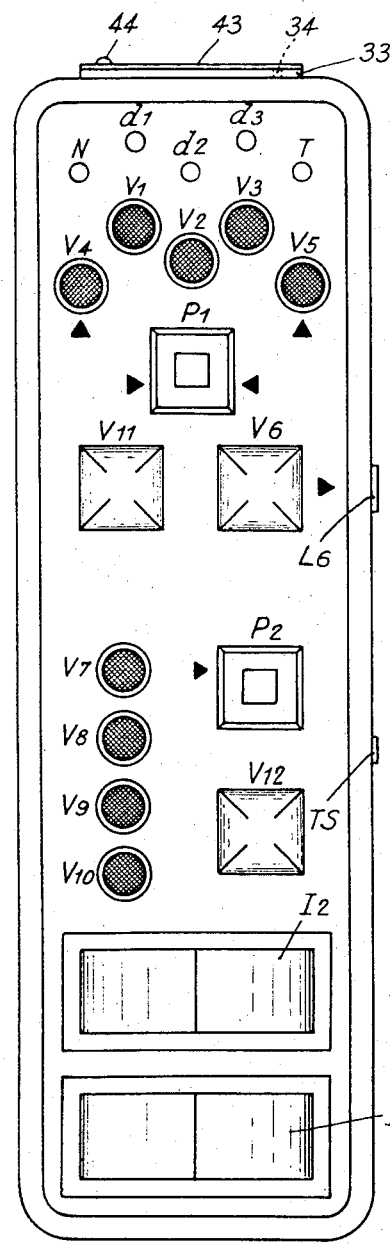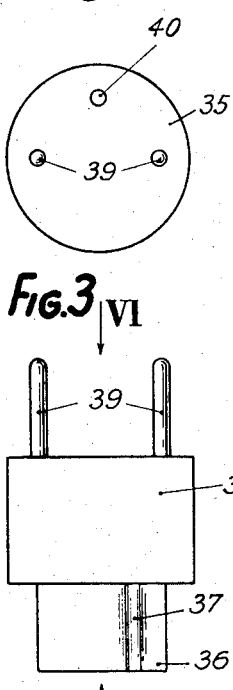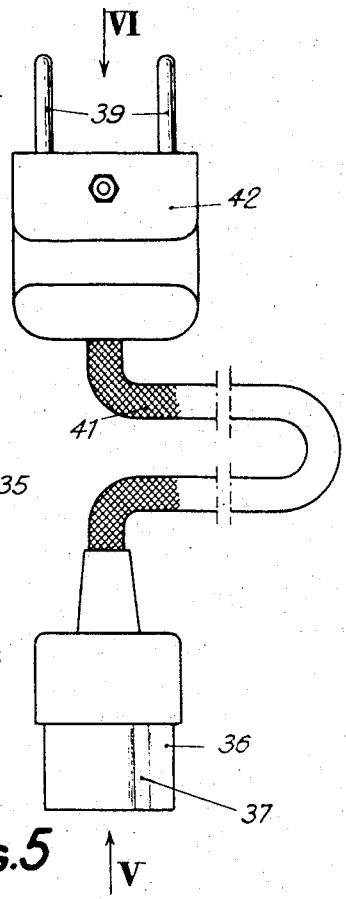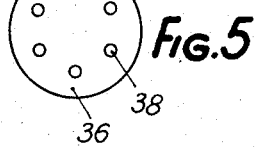

3,778,801

APPARATUS FOR INDICATING VOLTAGE PRESENCE, PHASE SEQUENCE, VOLTAGE MAGNITUDE, GROUND FAULTS, ETC. IN AN ELECTRICAL POWER DISTRIBUTION SYSTEM

BACKGROUND OF THE INVENTION

1. Field of the Invention

This invention relates to a device which monitors the magnitude, direction and continuity of voltages and currents of a bipolar or tripolar electrical power distribution system.

DESCRIPTION OF THE PRIOR ART

The intensive use of more and more numerous electrical apparatuses forces users to monitor the distribution of available current as well as ground connections, and it often forces them to identify the voltages available at each terminal or between terminals, for example, between neutral and phase or between two phases.

It is known to check on the continuity of a circuit or the existence of voltages between two conductors with simple connections involving, for example, neon diodes; but there is no apparatus capable of verifying, by means of simple connections to the base plates of current distribution sockets, the connection of a four-wire power supply, to detect a defect in the feed at each distribution terminal, to furnish the value of the distributed voltages and to indicate the nature of the current used, as well as the direction of rotation of the phases through the extinction and then the systematic lighting of an indicator lamp.

SUMMARY OF THE INVENTION

One object of this invention is an apparatus for controlling the distribution of a power system, characterized by the fact that it involves: (a) at least one box equipped with a base plate that carries at least four principal contact elements such as pins or sockets for connection to a power feed network; (b) at least four neon lamps, one terminal of each of these lamps being connected to only one of said contact elements, the other terminals of the lamps being connected in two groups of two; and (c) at least one switching means having two terminals, each of them being connected to one of the two groups of connected terminals of said neon lamps.

One of the advantages of such a combination is that it permits a user, through any kind of connection of the four-wire current distribution conductors to the four pins of the apparatus, to determine for a given position of the switch which electrically connects the terminals that are connected to the neon lamps, the position of the neutral line. In effect, only three lamps will light up if the four wires are normally connected to the distribution system. The position of the neutral line is indicated by the extinguished lamp.

Another object of the invention is an apparatus of this type whose switching means involves two other terminals, the first two terminals being connected by a first position of the switching means and the other two terminals being connected by a second position, each of these last terminals being connected, respectively, to one terminal of one of two supplementary neon lamps whose other terminal is connected to an auxiliary contact element, while one of said first terminals is connected to one of the two other terminals of the switching means.

Such an apparatus removes any ambiguity in case of a feed defect in one of the distribution lines. Let us assume that we have correctly linked the four feed wires to the four corresponding pins of the apparatus and only three lamps light up. To make sure that the extinguished lamp does not correspond to a terminal connected to a line with a break, it suffices to move the switching means from one position to the other. If the line does not have any break, the lamp lights up because it is placed in series with one of the said lamps; if, on the other hand, it remains extinguished, then this means that the corresponding terminal is connected to a line with a break. Furthermore, the pair of lamps, connected to one of the terminals of one and the other pair of terminals of the switching means, lights up at the same time as one of the supplementary lamps connected to the second pair of the terminals of the switching means, if one of said auxiliary contact elements is connected to the ground.

The device furthermore enables us to determine the following in case of a bipolar distribution connected to two of the principal sockets and connecting one of the auxiliary contact elements to the ground:

Whether there is continuity of the ground line (the control light corresponding to the auxiliary element lights up);

Whether we are dealing with a phase/phase or phase/ground distribution and in the latter case, the position of the phase indicated by the control light that remains lit and that corresponds to one of the principal connected sockets.

Another object of the invention is an apparatus of this type, two of whose principal contact elements are connected to a voltage amplifier circuit involving, in series, a lamp that indicates very low voltages, and in parallel, with said circuit, a circuit for the selective lighting of at least two lamps functioning for two different voltages, said selective lighting circuit being coupled to one or the other of the two principal terminals by a switching means.

It thus becomes easy to find the voltages that have been distributed while one can be sure that the distribution lines are being correctly supplied.

Another object of the invention is an apparatus of this type where three of the principal contact elements are connected to three terminals of an assembly of two circuits involving a throw-over switch, the first circuit involving an alternating-current indicating lamp in series with a condenser, said throw-over switch connecting, in a first position, two of the principal contact elements to the terminals of the second circuit, said circuit, involving in series, a condenser, a neon lamp, and two resistances, one of the resistances and the lamp being mounted in parallel with one resistance to which is connected said third contact element and the throw-over switch that switches the connections of the two other contact elements to the terminals of the second circuit in a second position.

We thus get an apparatus that is not only practical, because it enables us, by means of a simple connection to the network, to find out the voltages distributed between the lines, but that is also reliable because it is possible to check on the connection of the power lines as well as the supply of each line.

Another object of the invention is a variation in the mounting of the grounding continuity indicator and of the voltage level indicators, characterized by the fact that this mounting involves, on the one hand, diodes preventing any lighting due to the capacitance effect in case of rupture of the conducting wires and, on the other hand, Zener diodes which permit the lighting-up of the voltage indicator lights only for precise voltage values.

Another object of the invention is a variation in the mounting of the three indicators showing the presence of voltages at the terminals of a three-phase plug base plate, as it appears in the above-described control device, according to which we mount the three indicators connected to wires linked to the power cables of each phase, in a triangular arrangement where each signal indicator light is a neon tube in series with a diode connected to a Zener diode without modification of the other control device circuits connected to said wires which are linked to the phase conductors.

It is possible to incorporate into the single circuit thus modified the circuit of the grounding control signal and to incorporate this unique assembly, disconnected from the other parts of the control device, in any electrical apparatus to be controlled, in order to obtain permanent control over the good condition of electrical connections. Further, the new mounting thus accomplished prevents any lighting of neon lamps below a well-defined voltage, which is not always the case with the preceding mounting.

Another object of this invention is an adaptation of the circuits used in the above-described control device, according to which one can observe, at any moment, the continuity of the connection between the grounding wire and the apparatus to be monitored by incorporation of the control light and the circuits associated with it in this device into any circuit involving two active conductors and one grounded conductor.

This invention enables us in this manner, to exercise permanent control over the safety represented by the grounding, since a device such as this can then be placed both on the current plug of the apparatus connected to the current source and on the base plate used to mount the plug of the apparatus or on the apparatus itself.

BRIEF DESCRIPTION OF THE DRAWINGS

In the Drawings:
FIG. 1 is a perspective view of the apparatus;
FIG. 3 is a connecting plug for connecting the apparatus to the power supply base plate;
FIG. 4 is a variation of the connection in FIG. 3;
FIG. 5 is a view of the connections from V in FIGS. 3 and 4;
FIG. 6 is a view of the connections from VI in FIGS. 3 and 4.

DESCRIPTION OF THE PREFERRED EMBODIMENTS

In order to facilitate the comparison of the circuits in FIGS. 1–6 and the circuits of FIGS. 7-11, the latter circuits have been given numerical references above 100, while we have retained the same reference numbers as in FIGS. 1-5 for identical portions.

In FIG. 1, we have indicated by N, $d1$, $d2$ and $d3$, the four principal sockets that can be connected to the neutral point and to the three phases of a three-phase power supply and the letter T designates the auxiliary socket that can be connected to the ground. Sockets $d1$ and $d3$ can also be connected to a bipolar power line.

Indicators V4, V1, V2, V3 and V5 make it possible to transmit the indications, given by the circuits of the apparatus and corresponding, respectively, to the circuits allotted to the neutral point, to the three phases 1, 2 and 3 and to the ground.

Push button P1 is used to connect the circuits involved to the ground and to a test lamp whose indicator light is shown at V6. The test socket TS makes it possible to connect the apparatus test circuit to any given point.

The indicators V7, V8, V9 and V10 transmit the indication of the voltage between sockets $d1$ and $d3$ or between sockets $d1$ and N. In the example chosen these indicators correspond, respectively, to 24, 110, 220 and 380 volts.

The indicator V11 indicates the presence of alternating current between the sockets $d1$ and $d3$.

Indicator V12 indicates the direction of rotation of the phases of the lines connected to sockets $d1$, $d2$, and $d3$ in connection with the lefthand or righthand positions occupied by the throw-over switch l1, the direction of the field being 123 when indicator V12 is lighted and when the throw-over switch is on the lefthand position, whereas the direction is 132 when the indicator V12 is lighted and the throw-over switch is in the righthand position.

Push button P2 is used to apply voltage on the very low voltage circuit in which is inserted the lamp whose indicator is V7. A switch l2 enables us to assign the circuits of indicator lamps V8 to V10 either to the control of the voltage between sockets $d1$ and $d3$ or to control of the voltage between N and $d1$.

Figure 2:
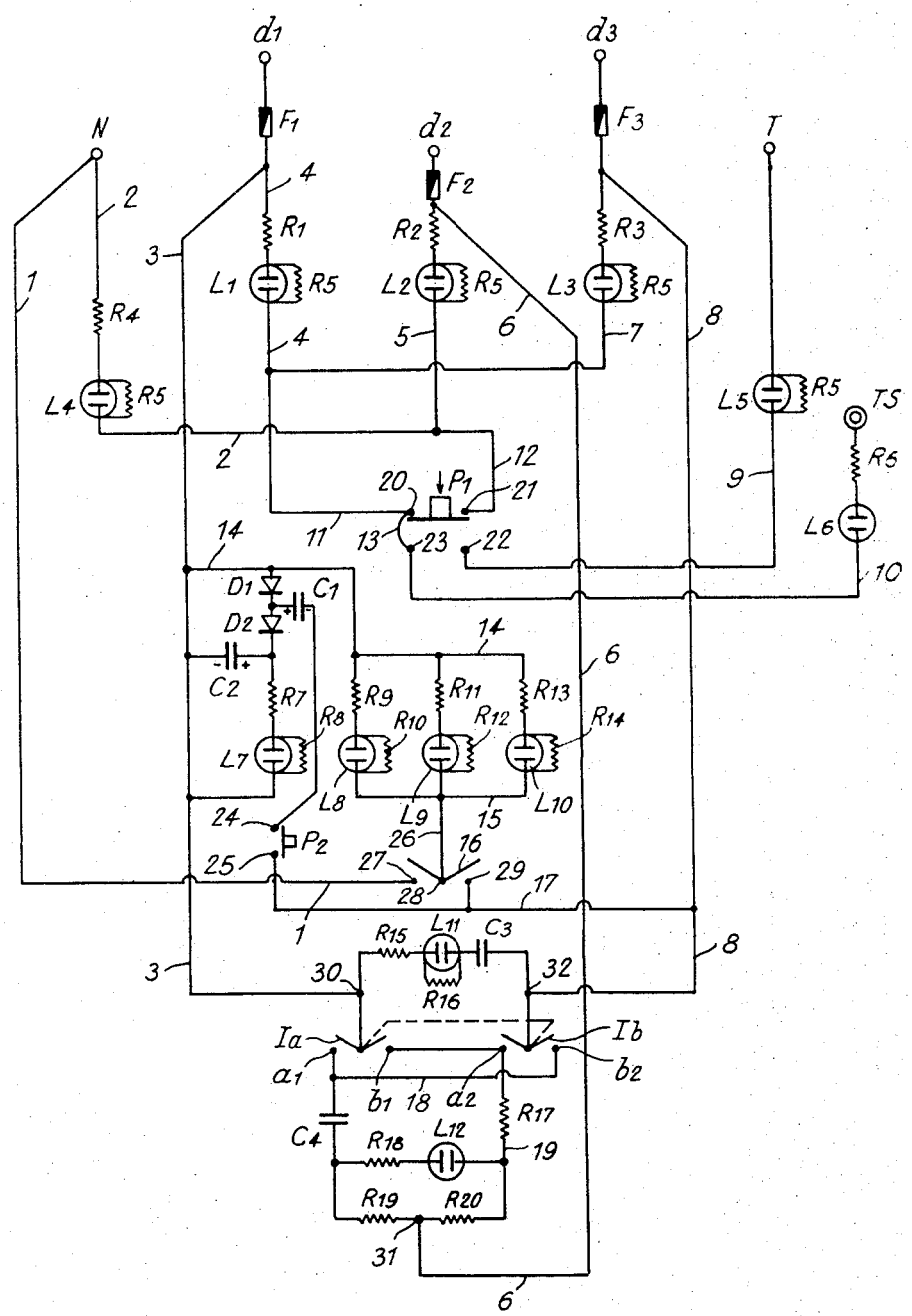
FIG. 2 shows the circuit diagram.

The various elements which have just been described can be found altogether with the same reference numbers on the circuit diagram in FIG. 2, with the exception of the indicators. The lamps corresponding to indicators V1 to V12 have been designated, respectively, with references L1 to L12.

The terminals 20 and 21 of the switching device with push button P1 are connected, respectively, by wires 11, 4 and 7 to neon lamps L1 and L3, and by 12, 5 and 2 to neon lamps L2 and L4. The lamps L1 and L3 are themselves connected respectively to the sockets $d1$ and $d3$ by means of the resistance R1 and the fuse F1 for L1 and by the resistance R3 and the fuse F3 for $d3$. Likewise, lamps L2 and L4 are connected, respectively, to the sockets $d2$ and N by the resistance R2 and the fuse F2 for $d2$ and by the resistance R4 for N.

Terminals 22 and 23 are connected by wires 9 and 10, respectively, to lamps L5 and L6. The connection 13 furthermore links the terminals 20 and 23.

We have mounted, in parallel with each of the lamps L1 to L5, a resistance whose value can be the same. These resistances have thus been designated by the same reference number R5.

The terminals 24 and 25 of push button P2 are connected, respectively, to the condenser C1 of a voltage doubler and to the fuse F3 by means of wires 17 and 8. The lamp L7 is connected to the voltage doubler by the resistance R7 and is protected by the resistance R8, mounted parallel to the terminals of L7. The values of the resistances and the capacitances C1 and C2 are so selected that the lamp L7 will go on the moment the voltage between the conductors, connected to the sockets $d1$ and $d3$, reaches a certain value, 24 volts in the example chosen. By making sure that we use suitable condensers for C1 and C2, paper condensers according to the invention, we can get the lamp L7 to blink the moment the voltage reaches 20-22 volts; the lamp remains on the moment the voltage reaches 24 volts between $d1$ and $d3$.

Wire 14, to which the diode D1 of the voltage doubler is connected, furthermore supplies three other circuits made up, respectively, of a resistance R9, R11 or R13 and of a lamp in series: L8, L9 or L10. Resistances R10, R12 and R14 are arranged in parallel between the lamps L8, L9 and L10, one of whose terminals is connected, by wires 15 and 26, to the terminal 28 of the switching device controlled by the throw-over switch I2 whose contact elements 16 are automatically retracted into the position shown. The terminal 27 is connected to N by wire 1, whereas terminals 28 and 29 are connected, respectively, to wire 26 and to wire 17.

It thus suffices to link the terminals 28 and 27 by means of the throw-over switch in order to find out the value of the voltages existing between the sockets N and $d1$. The values of the impedances of each of the three circuits are such that lamps L8, L9 or L10 do not light up except when the voltage between N and $d1$ attains a given value. In the example adopted here, L8 lights up for a voltage of 110 volts, L9 goes on for a voltage of 220 volts, and L10 goes on for 380 volts.

By turning the throw-over switch I2 back to the terminals 28 and 29, we can check on the voltages between $d1$ and $d3$.

Wires 3, 6 and 8 furthermore lead to terminals 30, 31 and 32 of a circuit involving a throw-over switch I1 with two switching elements I$a$ and I$b$, capable of assuming three positions. One of these positions, called the lefthand position, connects 30 to the terminal $a1$ and 32 to the terminal $a2$. The other of these positions, called the righthand position, connects 30 and $b1$ on the one hand, and 32 and $b2$ on the other hand. The third position is the neutral position represented in the drawing and obtained automatically by a recovery spring. Lamp L11 is inserted, in series, with the condenser C3, and thus L11 lights up only when we have an alternating current at the terminals 30 and 32.

When the throw-over switch, made up of contacts I$a$ and I$b$, is flicked to the left and lamp L12 is inserted in the circuit and remains extinguished, whereas the three lamps L1, L2 and L3 are lit up, then it suffices to flick the throw-over switch into the righthand position in order to make L12 light up. Under these conditions, we can be certain that the direction of the phases of voltages available at $d1$, $d2$ and $d3$ is 132.

In the contrary case, that is to say, in case of the illumination of L12 while the throw-over switch is in the lefthand position, the direction of rotation of the phases is 123 and L12 is extinguished by flicking the throw-over switch to the right.

It is clear that the circuits which have just been described can be applied to other types of current distribution systems and that one could also provide other DC or AC voltage values by doubling certain circuits.

On the other hand, in order to facilitate the connection of the apparatus to the distribution network and in order easily to spot junctions with respect to the circuits connected to N, $d1$, $d2$, $d3$ and T, a base plate is mounted at 33 and equipped with an edge 34. A connector 35, FIG. 3, involves a base plate 36 including, in addition to the slot 37, which cooperates with edge 34 of base plate 33, a series of sockets 38, FIG. 5. These sockets are connected, according to the network voltage supply socket type, to terminals and sockets such as 39 and 40, FIGS. 3 and 6. In the example shown, we want to connect a bipolar distribution system with ground plate. The connector 35, for a tripolar power feed or a four-wire power feed would thus be identical to the one shown in FIG. 3 for part 36, whereas the terminals and sockets 39 and 40 would be different in terms of number and position.

FIG. 4 shows a simple variation of the connection of FIG. 3 in which part 36 is connected by flexible wires 41 to a connector 42 carrying terminals 39.

The box in FIG. 1 can be modified in many ways. The closing tongue 43, pivoting at 44, can be replaced by a simple slide and the various circuit elements constituting the apparatus can be replaced by other known equivalents such as a transformer or voltage tripler instead of the voltage doubler, replacement of lamp L11 and of condenser C3, in series, with a single neon lamp which will go on only in the case of alternating current, for example. It would likewise be possible to use the apparatus only for a bipolar or tripolar distribution so that only sockets $d1$, $d3$ and T would be required.

Figure 7:
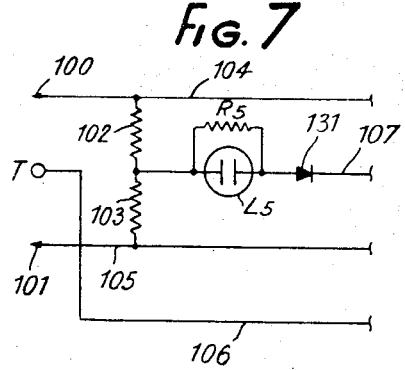
FIG. 7 shows the electrical diagram of the plug device, provided with the ground continuity control circuit according to the invention.

In FIG. 7 we have shown the plug circuit of an apparatus where we want permanently to control the continuity of the connection of the neutral point, which is to be controlled, to the ground. For this purpose, the former is equipped with a socket T which is electrically connected to grounding wire 106 and with two terminals 100 and 101 which receive the voltages transmitted by the sockets to which they are connected, resistances 102 and 103 connecting the active conductor wires 104 and 105, a neon diode L5 and its parallel resistance R5 connecting the wire 107, which is connected to the mass of the apparatus to be controlled, to the junction of resistances 102 and 103.

According to one version of the invention, the indicator is arranged on the box of the socket itself, the three resistances 102, 103 and R5 being soldered together with one of the connection wires of the neon diode at a point placed on the support of the two terminals or at least in its immediate vicinity. In spite of the small dimensions of the connectors, it is thus possible to incorporate the resistances 102, 103 and R5 into the inside of the plug box, with the neon lamp L5 on the outside surface of the box.

It is clear that the neon lamp L5 remains on only if the electrical continuity of the circuit is assured.

Figure 8:
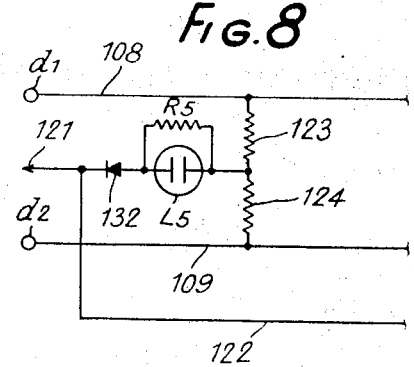
FIG. 8 is the electrical diagram of said control circuit included in the circuits of a current plug base plate.

When the number of apparatus to be checked is large, it may be a good idea to mount the monitoring circuits on the base plate of the current plug used for successively connecting the various apparatuses to be checked. FIG. 8 shows the verification circuits used and these circuits are made up of sockets d1 and d2, linked respectively to the power supply conductors 108 and 109 of the terminal 121 which is linked, on the one hand, to the terminals of the indicator L5 and of its resistance R5, and on the other hand, to the ground wire 122 and the resistances 123 and 124 whose junction point is connected to the other terminal of indicator L5.

Figure 9:
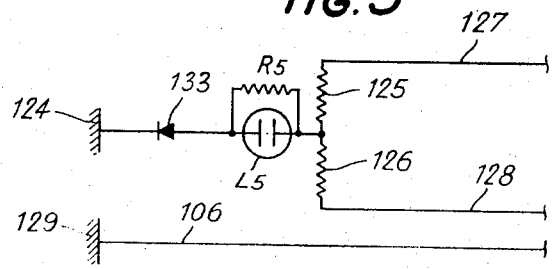
FIG. 9 is the electrical diagram of a control circuit included in the circuit for the connection to the ground of an apparatus to be controlled.

We can also, during the manufacture of the apparatus, whose correct bonding we want to control permanently, incorporate an indicator L5, FIG. 9, in any desired place on the apparatus, the indicator L5 and its resistance R5 being connected on the one hand, to the bonding 124, and on the other hand, to the junction point of resistances 125 and 126, arranged between conductors 127 and 128. Another point 129 of the apparatus is connected to wire 106. It should be understood that FIGS. 7, 8, and 9 correspond to specific portions of FIG. 2 with the lamps L1 and L3 and switch P1 deleted. More specifically, wires 104, 108 and 127 of FIGS. 7, 8, and 9, respectively, correspond to wire 4 of FIG. 2, while wires 105, 109 and 128 correspond to wire 7. In addition, wires 107, 121 and 124 of FIGS. 7, 8, and 9, respectively, correspond to wire 9 of FIG. 2. Wires 106, 122 and 129 are coupled to the ground connection of the external supply to which point T of FIG. 2 is connected.

Figure 10:
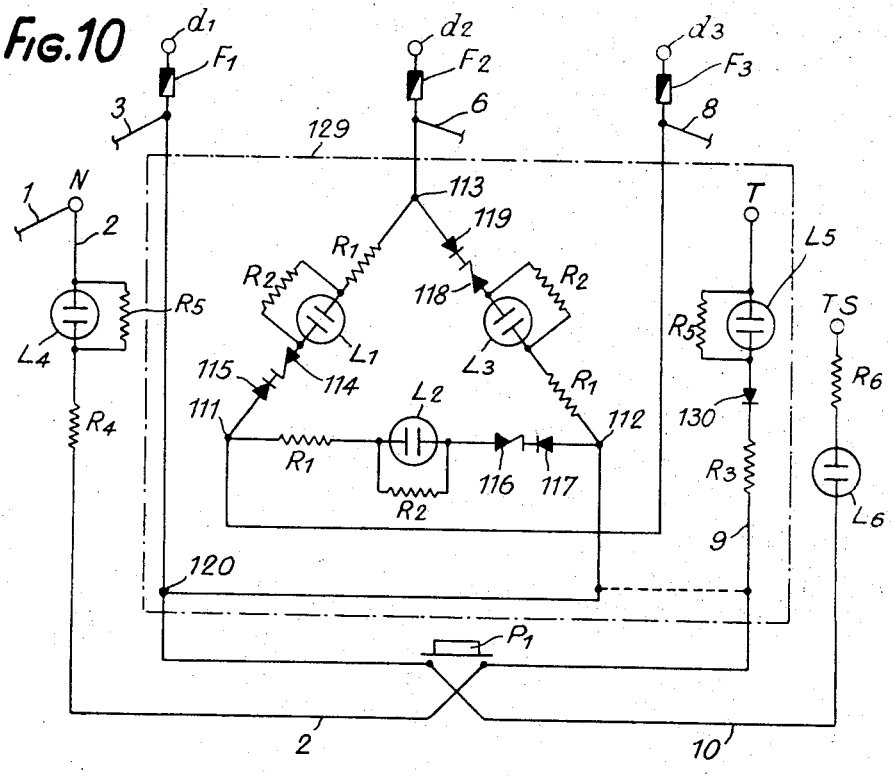
FIG. 10 is the electrical diagram of a variation of the control circuit for the application of voltage to the wires connected to the power supply of a three-phase current source.

In FIG. 10 we have shown a variation in the mounting of indicators L1, L2 and L3 which indicate the presence of voltages on the sockets d1, d2 and d3. In order not to crowd the drawing with the unmodified portions of the circuit shown in FIG. 2, we have cut the wires 1, 3, 6 and 8 and it is, of course, understood that the circuits to which they are connected are identical to those shown in FIG. 2. In the variation which is the object of this invention, the fuses F1, F2 and F3 are connected, respectively, to the terminals 112, 113 and 111.

The indicator L1 and its resistance R2, mounted in parallel, are connected by one of their common terminals to the resistance R1 which is connected to the terminal 113 and by their second common terminal they are connected to Zener diode 114 which itself is linked by its other electrode to diode 115 that is connected to the terminal 111. An identical mounting can be found between the terminals 111 and 112, between which we have placed the resistance R1, the indicator L2 and its resistance R2, the Zener diode 116 and the diode 117. Likewise, between terminals 112 and 113 we find the resistance R1, the indicator L2 and its resistance R2, the Zener diode 118 and the diode 119. The wires 2, 9 and 10 involve, respectively, the indicators L4, L5, and L6 which are connected to the sockets N for return via the neutral point, T for the grounding and TS for the connection to any desired point on the apparatus to be tested, thus permitting separate or simultaneous controls of the circuits assigned to them.

When we want permanent control of power supply for the apparatuses used, we can mount, on each apparatus, the assembly of circuits shown inside the rectangle in the dotted lines 129.

We can obviously add here all or a portion of the circuits described in FIG. 2 and especially an indicator that will show the direction of rotation of the phases at the power conductor terminals. These indicators can be placed at any point on the apparatus and the direction of rotation is indicated preferably in the form of a luminous arrow in the immediate vicinity of indicators L1 to L3.

In order to prevent capacitive effects which might entail the risk of causing the lighting of indicator L5, in case of a cutoff of the grounding circuits, we added in FIG. 7 a diode 131 on the wire 107 connected to the mass to be controlled, a diode 132 inn FIG. 8 between terminal 121 and the indicator L5, a diode 133 in FIG. 9 between the mass 124 and the indicator L5, and a diode 130, in FIG. 10, between the indicator L5 and the resistance R3.

Figure 11:
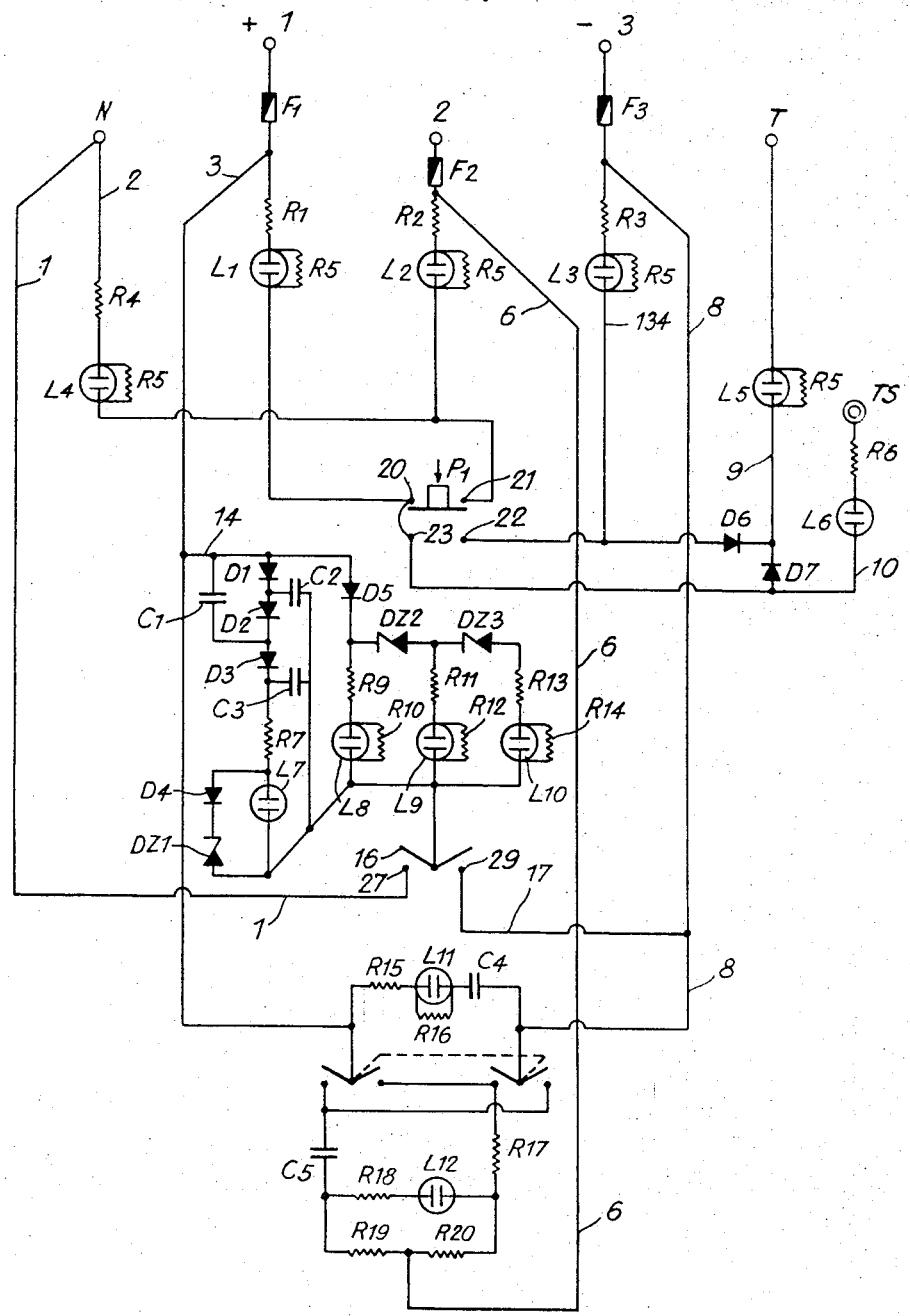
FIG. 11 is the electrical diagram of a variation of the electrical circuits of the current distribution controller.

In the variation of the assembly of electrical circuits of the all purpose current distribution control apparatus shown in FIG. 11, we note that wire 134 is connected directly to terminal 22 of the push button switch P1 and that a diode D6 links this terminal to wire 9 of the circuit of neon lamp L5 which is connected to the terminal that serves for the control of the grounding. Likewise, a diode D7 links the wire 10, which is connected to terminal 23, to the wire 9. In this way we can prevent any untimely illumination due to the capacitance effect in case a connecting wire should break. By depressing the push button P1, the two diodes D6 and D7 complete the circuits L1, L5 on the one hand, and L3, L5, on the other hand, thus enabling us to prevent a circulation of capacitative current between the lines connected to the ground and the power lines.

In order to get the voltage indicating lamps L7 to L10 to light up, these being the lamps that indicate precise voltage values, we have incorporated a series of diodes in combination with the Zener diodes whose characteristics have been so selected as to respond to the voltages considered here. In this arrangement, diode D4 and Zener diode DZ1 protect the neon lamp L7 and enable us to get it to light up, in the example considered, even when we have 380 volts, without any risk to L7.

In line 14 we have incorporated a diode D5 in series with the two Zener diodes DZ2 and D23, DZ2 being mounted between R9 and R11 and D23 being mounted between R11 and R13. We can get L9 and L10 to light up at predetermined voltages depending on the choice of DZ2 and D23. In the Example selected here, L9 lights up 220 volts and L10 lights up 380 volts. The illumination of L8 is determined in the conventional manner by the values of R9 and R10. In the Example considered, L8 lights up at 110 volts.

What is claimed is:

1. An apparatus for detecting the proper distribution of an electrical power supply network, characterized by:

a. a housing equipped with a base plate connector having at least four principal contact elements for connection to the lines of a power supply network;

b. at least four voltage responsive neon indicator lamps mounted in and visible through the housing and having first and second terminals, the first terminals of the lamps being individually connected to said contact elements, the second terminals of the lamps being connected in two groups of two; and c. switching means mounted in the housing and having two first terminals, each one of said two first terminals being connected to one of the two connected terminal groups of said neon lamps, the switching means normally connecting the two first terminals together, whereby voltage differences between the two groups are normally indicated, and voltage differences just between two contact elements of each group may be indicated by operating the switching means to disconnect the two first terminals.

2. Apparatus as in claim 1, wherein the switching means includes two second terminals, said two first terminals being connected together in a first, normal position of the switching means and the two second terminals being connected together in a second position of the switching means, each of said two second terminals being individually connected to one terminal of two additional neon lamps, the other terminal of each additional lamp being individually connected to two additional contact elements, and shunt means connecting one of said first terminals of the switching means to one of the second terminals of the switching means.

3. Apparatus as in claim 2, wherein one of said additional contact elements is adapted to be connected to a ground wire of the power supply network.

4. Apparatus as claimed in claim 1, wherein two of the principal contact elements are connected to a voltage doubler circuit, including a low-voltage indicating lamp, and further comprising a selective illumination circuit connected in parallel with said voltage doubler circuit and comprising at least two indicating lamps illuminable at different voltages, and switching means for coupling said selective illumination circuit to one or the other of said two of the principal contact elements.

5. An apparatus as defined in claim 1 further comprising:
   a resistor, an alternating current indicating lamp, and a capacitor all connected in series between two of the principal contact elements,
   a circuit comprising two switch terminals, a capacitor and first, second and third resistances all connected in series between said terminals, and a neon lamp and a resistance connected in series across the first and second resistances, means connecting a third one of the principal contact elements to the junction of the first and second resistances, and a two position switching means for reversibly connecting said two of the principal contact elements to the two switch terminals.

6. Apparatus for monitoring the proper distribution of an electrical power supply network, comprising:
   a. a housing equipped with a base plate connector having at least two principal contact elements for connection to the lines of a bipolar power supply network;
   b. at least two voltage responsive neon indicator lamps mounted in and visible through the housing and having first and second terminals, the first terminals of the lamps being individually connected to said contact elements, the second terminals of the lamps being individually connected to a junction point; and
   c. switching means mounted in the housing and having at least two terminals; the first terminal being connected to said junction point and the second terminal being connected to a terminal of a further neon lamp whose other terminal is connected to an additional contact element adapted for connection to the ground, said switching means connecting its two terminals in a first position and disconnecting its two terminals in a second position, whereby voltage differences between said principal contact elements and ground are indicated in the first switch position, and voltage differences just between said principal contact elements are indicated in the second switch position.

7. Apparatus as in claim 6 wherein the two principal contact elements are further connected to the terminals of a series circuit comprising an alternating current indicating lamp and a condenser.

8. A device for permanently monitoring the application of voltage to circuits used in connecting an apparatus to power supply conductors, comprising: a housing on which is mounted a power plug base plate, a neon indicator lamp mounted in the housing and visible on the outside surface of said housing, two lines for connection to two power supply conductors on one end and to two sockets in the base plate on the other end, each line being connected through a resistance to one of the terminals of the indicator lamp, the other terminal of the indicator lamp being connected to the ground of the apparatus to be monitored.

9. A device as claimed in claim 8 further comprising a diode connected between said other terminal of the indicator lamp and ground for suppressing capacitance effects in case the current to one of the power supply conductors is cut off.

10. A device for permanently monitoring the application of voltage to circuits for connecting an apparatus to the three power supply conductors of a three phase source, comprising: a three leg delta connected circuit having three corner terminals, three conductor wires connecting, respectively, one of the three power supply conductors to one of the three corner terminals, each leg of the delta connected circuit comprising a resistance, a neon indicator lamp, a Zener diode and a diode all connected in series, a ground connection, one of said conductor wires being further connected to the ground connection through a series circuit including a further resistance and a further neon indicator lamp.

11. A device as claimed in claim 10 further comprising: a switch having a first terminal connected to said one of said conductor wires and a second terminal connected to said further resistance, said first terminal of the switch being further connected to a test voltage terminal through a series circuit including an indicator lamp and a resistance, and said second terminal being further connected to a neutral point of the power supply source through a series circuit including a resistance and an indicator lamp.

12. A device for monitoring the proper distribution of an electrical power supply network including three power lines fed from a three phase source, a neutral terminal, and a ground terminal, comprising:
   first, second and third neon indicator lamps having first and second terminals, said first terminals being individually connected to the three power lines,
   a fourth neon indicator lamp connected between the neutral terminal and the second terminal of the second indicator lamp,
   switch means having a first position in which the second terminals of the first and second indicator lamps are connected together, and a second position in which the second terminals of the first and third indicator lamps are connected together, and
   a fifth neon indicator lamp having a first terminal connected to the ground terminal and a second terminal connected to the second terminal of the third indicator lamp through a first diode and to the second terminal of the first indicator lamp through a second diode.

* * * * *